(12) United States Patent
Lyu et al.

(10) Patent No.: US 12,670,573 B2
(45) **Date of Patent: \*Jun. 30, 2026**

(54) SYSTEM FOR FINDING BLACK SPOTS IN A SEPARATOR FROM A RECHARGEABLE BATTERY CELL

(71) Applicants: SAMSUNG SDI CO., LTD., Yongin-si (KR); NSYS CORPORATION, Cheonan-si (KR)

(72) Inventors: Seungwoo Lyu, Yongin-si (KR); Jungyi Yu, Yongin-si (KR); Changyeon Hwang, Yongin-si (KR); Leehwan An, Yongin-si (KR); Bong-Kil Moon, Cheonan-si (KR)

(73) Assignees: SAMSUNG SDI CO., LTD., Yongin-si (KR); NSYS CORPORATION

( * ) Notice: Subject to any disclaimer, the term of this patent is extended or adjusted under 35 U.S.C. 154(b) by 165 days.

This patent is subject to a terminal disclaimer.

(21) Appl. No.: 18/382,198

(22) Filed: Oct. 20, 2023

(65) Prior Publication Data

US 2024/0338807 A1 Oct. 10, 2024

(30) Foreign Application Priority Data

Apr. 10, 2023 (KR) ........................ 10-2023-0047090

(51) Int. Cl.
*G06T 7/00* (2017.01)
*G06T 7/70* (2017.01)
(Continued)

(52) U.S. Cl.
CPC .............. *G06T 7/0004* (2013.01); *G06T 7/70* (2017.01); *H01M 10/0409* (2013.01);
(Continued)

(58) Field of Classification Search
CPC ..................... G06T 7/0004; G06T 7/70; G06T 2207/10064; G06T 2207/10116;
(Continued)

(56) References Cited

U.S. PATENT DOCUMENTS

2015/0115976 A1* 4/2015 Adams ............... G01N 21/8901
324/554
2015/0167126 A1* 6/2015 Suzuki ...................... C22F 1/04
420/532
(Continued)

FOREIGN PATENT DOCUMENTS

CN 207521382 U * 6/2018
CN 114740011 A * 7/2022 ......... G01N 21/8901
(Continued)

OTHER PUBLICATIONS

Huber et al. "Method for classification of battery separator defects using optical inspection", Procedia CIRP 57, 49th CIRP Conference on Manufacturing Systems (CIRP-CMS 2016), 2016 585-590, ScienceDirect (Year: 2016).*
(Continued)

*Primary Examiner* — Richard A Hansell, Jr.
(74) *Attorney, Agent, or Firm* — Lee IP Law, P.C.

(57) ABSTRACT

A system for finding black spots in a separator includes a winder, a rewinder that takes out and winds a separator from a rechargeable battery cell and supplies a sample of the separator; a foreign material remover that removes a foreign material from the separator; an image measurer that obtains a first image where black spots are estimated in the separator passing through the foreign material remover with a first camera and records the position of the first image; a second image measurer that selects where black spots are estimated and acquires an image of black spots and foreign material other than black spots recorded by a second camera by using the first image for the separator passing through the mea- (Continued)

surer; and a black spot sorting unit displaying the position after secondarily selecting black spots by deep learning the first image and the second image with a deep learning software.

12 Claims, 18 Drawing Sheets

(51) Int. Cl.
  *H01M 10/04*          (2006.01)
  *H04N 23/56*          (2023.01)
(52) U.S. Cl.
  CPC ... *H04N 23/56* (2023.01); *G06T 2207/10064* (2013.01); *G06T 2207/10116* (2013.01); *G06T 2207/20081* (2013.01); *G06T 2207/30136* (2013.01)
(58) Field of Classification Search
  CPC . G06T 2207/20081; G06T 2207/30136; G06T 2207/20084; G06T 7/001; H01M 10/0409; H01M 50/403; H04N 23/56; Y02E 60/10; G01N 21/892; G01N 21/8851; G01N 21/8903; G01N 23/223; G01N 2021/8858; G01N 2021/8861; G01N 2021/888; G01N 2223/076; G01N 2223/652; B08B 7/0028; G06N 3/08
  See application file for complete search history.

(56)          References Cited

U.S. PATENT DOCUMENTS

2019/0165425 A1* 5/2019 Suzuki .............. H01M 10/0431
2020/0001513 A1* 1/2020 Jones .................. G01N 21/896

| | | | |
|---|---|---|---|
| 2020/0227710 A1 | 7/2020 | Shinomiya et al. | |
| 2021/0288383 A1* | 9/2021 | Hong ................ | H01M 10/0525 |
| 2022/0013858 A1 | 1/2022 | Nakazawa et al. | |
| 2023/0368367 A1* | 11/2023 | Zeng .................. | H01M 10/4285 |
| 2025/0037263 A1* | 1/2025 | Zhao ........................ | G06T 7/001 |

FOREIGN PATENT DOCUMENTS

| | | | | | |
|---|---|---|---|---|---|
| EP | 4254262 A1 | | 10/2023 | | |
| JP | 2012-109029 A | | 6/2012 | | |
| JP | 2013043347 A | * | 3/2013 | | |
| JP | 2022-016067 A | | 1/2022 | | |
| KR | 10-2278801 B1 | | 7/2021 | | |
| KR | 10-2022-0111364 A | | 8/2022 | | |
| KR | 1020220111364 | * | 8/2022 | | |
| WO | WO-2017191361 A1 | * | 11/2017 | ............. | H04N 23/66 |
| WO | WO 2022/114665 A1 | | 6/2022 | | |
| WO | WO-2023102657 A1 | * | 6/2023 | ........... | G06T 7/0004 |
| WO | WO 2023/202207 A1 | | 10/2023 | | |

OTHER PUBLICATIONS

Du Baret De Lime Arnaud et al: "Impact of Electrode Defects on Battery Cell Performance: A Review", Batteries & Supercaps, [Online] vol. 5, No. 10, Sep. 7, 2022.
Huber Josef et al: "Non-destructive Quality Testing of Battery Separators", Procedia CIRP, [Online] vol. 62, 2017, pp. 423-428.
Extended European Search Report dated May 2, 2024, for corresponding European Patent Application No. 23207732.1.
Extended European Search Report dated May 2, 2024, for corresponding European Patent Application No. 23208117.4.
US Office action dated Dec. 29, 2025, in co-pending, related U.S. Appl. No. 18/381,811.

* cited by examiner

S

BS1

SYSTEM FOR FINDING BLACK SPOTS IN A SEPARATOR FROM A RECHARGEABLE BATTERY CELL

CROSS-REFERENCE TO RELATED APPLICATION

This application claims priority to and the benefit of Korean Patent Application No. 10-2023-0047090, filed in the Korean Intellectual Property Office on Apr. 10, 2023, the entire contents of which are incorporated herein by reference.

BACKGROUND

1. Field

Embodiments relate to a system for finding black spots in a separator.

2. Description of the Related Art

As is known, for a stable cell operation of a rechargeable battery, cells with fine short circuits between positive electrode and negative electrode may be identified and managed in advance. The cells identified in this way are generally referred to as voltage change (DV, difference) defects, i.e., "dV defects".

The dV defects are mainly caused by the short-circuits formed by an oxidation of metal foreign materials inside the positive electrode and a reduction precipitation to the negative electrode and the separator. These short-circuits are called "black spots" because they appear to naked eyes as black dots.

SUMMARY

Embodiments are directed to a system for finding black spots in a separator, the system including a winding machine and a rewinder that take out and wind a separator from a rechargeable battery cell to produce and supply a sample of the separator; a foreign material removal unit that removes a foreign material from the surface of the separator; a first image measuring unit that obtains a first image of a part where black spots are estimated in the separator passing through the foreign material removal unit with a first camera and records the position of the first image; a second image measuring unit that first selects a part where black spots are estimated and acquires a second image of black spots and a foreign material other than black spots for the recorded position by a second camera by using the first image for the separator passing through the first image measuring unit; and a black spot sorting unit that displays the position after secondary selecting the black spots by deep learning the first image and the second image with a deep learning software.

The winding machine may unfold the selected electrode assembly, attach one surface of one separator among the unfolded positive electrode, negative electrode, and two separators to the winding machine core, and then wind the selected electrode assembly to produce a sample of the separator.

The foreign material removal unit may include a first adhesion roller that is sequentially in contact with and rotates with the first surface of the separator to remove foreign materials. A first removal roller that has stronger adhesion than that of the first adhesion roller by a rotation may be in contact with the first adhesion roller. A second adhesion roller that is sequentially in contact with and rotates with the second surface of the separator may remove foreign materials. A second removal roller that has a stronger adhesion than that of the second adhesion roller may be in contact by a rotation with the second adhesion roller.

The first camera may be a line camera. The first image measuring unit may include a roll-to-roll driving unit that stops when measuring the first image with the first camera and measures the first image from the separator.

The second camera may be an area camera, the second image measuring unit may include a stage driving unit that follows the roll-to-roll driving unit and measures the second image from the separator.

The first image measuring unit may include a reflected light that lights one surface of the separator from the first camera side and reflects the light from the separator, and a transmission light that lights another surface of the separator and transmits light through the separator.

The reflected light may be reflected by 45 degrees by the first camera. The transmission light may be reflected by 180 degrees by the first camera.

The first image measuring unit may further include a first image position recorder for recording the position of the first image by recognizing coordinates during the movement of the separator and by displaying a reference marking code on the separator with an equal interval.

The first image measuring unit may further include a first image position recorder that calculates a distance according to the movement time of the separator to set the Y coordinate, and that may record the position of the first image by setting the X coordinate in the width of the separator within the measurement area of the first camera.

The first image measuring unit may further include a first sorting unit that sorts black spots and foreign materials other than black spots by using data that is capable of being obtained from the first image. The second image measuring unit may further include a second sorting unit that performs deep learning on the first image and the second image to secondary sort the black spots from foreign materials other than black spots.

The system for finding black spots in the separator according to an embodiment may further include a component analysis unit for analyzing components of the black spots that are selected by the black spots sorting unit.

The component analysis unit may analyze the components of the black spots with X-rays by using an X-ray fluorescence analysis (XRF) equipment.

The black spots may be formed from metal components The metal components may include copper, zinc, or stainless steel, as examples.

Foreign materials other than the black spots may include one of positive active material, negative active material, stamping, folding, separator foreign material, and side reactants.

The system for finding the black spots of the separator according to an embodiment first selects the first image by using the first camera, acquires a second image with the second camera to be in the position where the first image was recorded, deep-learns the first image and the second image to secondarily select the black spots, and displays the position of the black spots, thereby reducing a dispersion of the black spots found among analysts, increasing a ratio of finding the black spots, and improving an inspection speed. In addition, the embodiment may further analyze the components of the black spots with X-rays by using X-ray fluorescence analysis (XRF) equipment.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
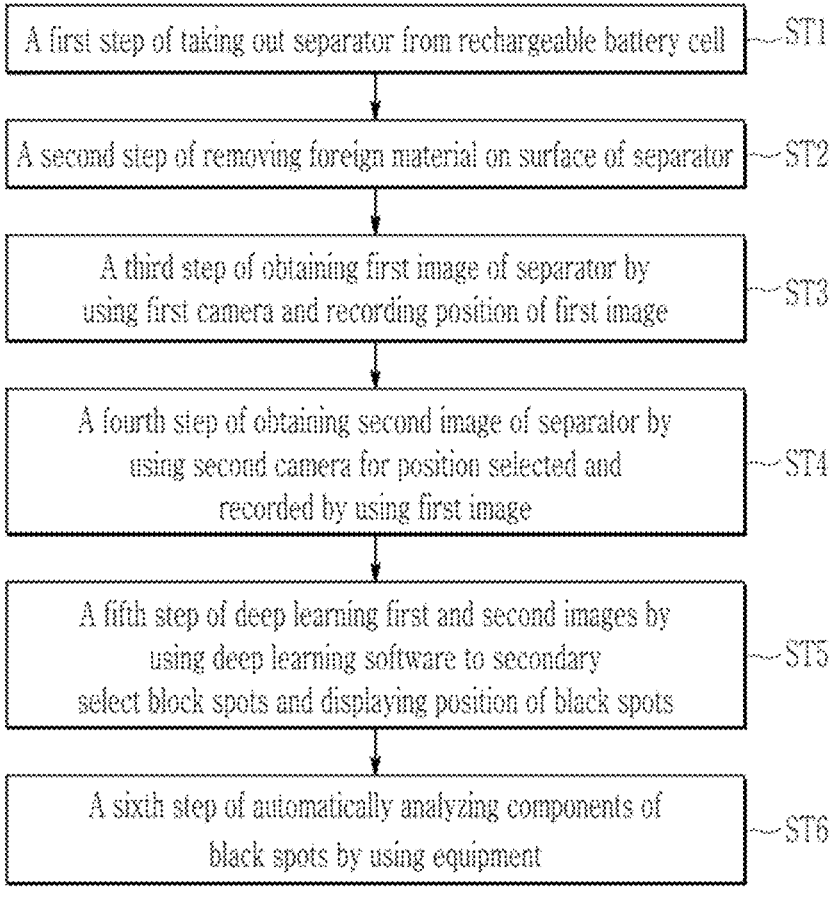
FIG. 1 is a flowchart of a method for finding black spots of a separator according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
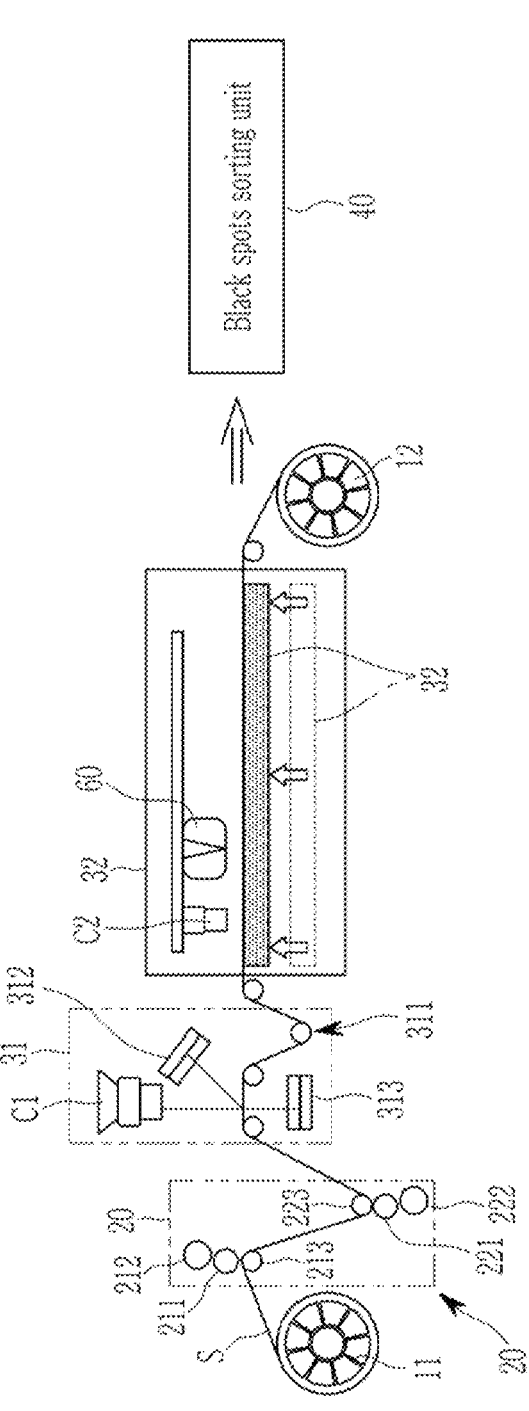
FIG. 2 is a schematic diagram of a system for finding black spots of a separator according to an embodiment.

FIG. 1 is a flowchart of a method for finding black spots of a separator according to an embodiment. FIG. 2 is a schematic diagram of a system for finding black spots of a separator according to an embodiment. The method for finding the black spots of the separator and the system used for this method to find the black spots of the separator are explained together with reference to FIG. 1 and FIG. 2.

Referring to FIG. 1 and FIG. 2, the method for finding the black spots of the separator according to an embodiment may further include a first step ST1, a second step ST2, a third step ST3, a fourth step ST4, and a fifth step ST5. The system for finding the block of the separator of an embodiment includes a winding machine 11, a rewinder 12, a foreign material removal unit 20, a first image measuring unit 31, a second image measuring unit 32, and a black spots sorting unit 40.

In the first step ST1, the separator is taken out from a rechargeable battery cell. The winding machine 11 is configured to manufacture a sample of the separator S by taking out and winding the separator from the rechargeable battery cell. The winding machine 11 acts as an unwinder to supply the separator S manufactured as a sample from the system, and the rewinder 12 is configured to rewind the separator S passing through the second image measuring unit 32 to be recovered from the system.

In the first step ST1, after disassembling a prismatic case of the rechargeable battery cell and taking out the plurality of electrode assemblies, an amount of a voltage drop is checked to select one electrode assembly out of the plurality of electrode assemblies. The selected electrode assembly is unfolded, and one surface of the separator S of one among the unfolded positive electrode, negative electrode and two separators is attached to a core of the winding machine 11 to be wound, thereby preparing the sample of the separator S.

Therefore, the winding machine 11 is configured to unfold the selected electrode assembly, attach one surface of the separator S of one of the unfolded positive electrode, negative electrode, and two separators to the core of the winding machine 11, and then the described attached separators and electrodes to manufacture the sample of the separator S. A detailed description of the winding machine 11 will be omitted.

Figure 3:
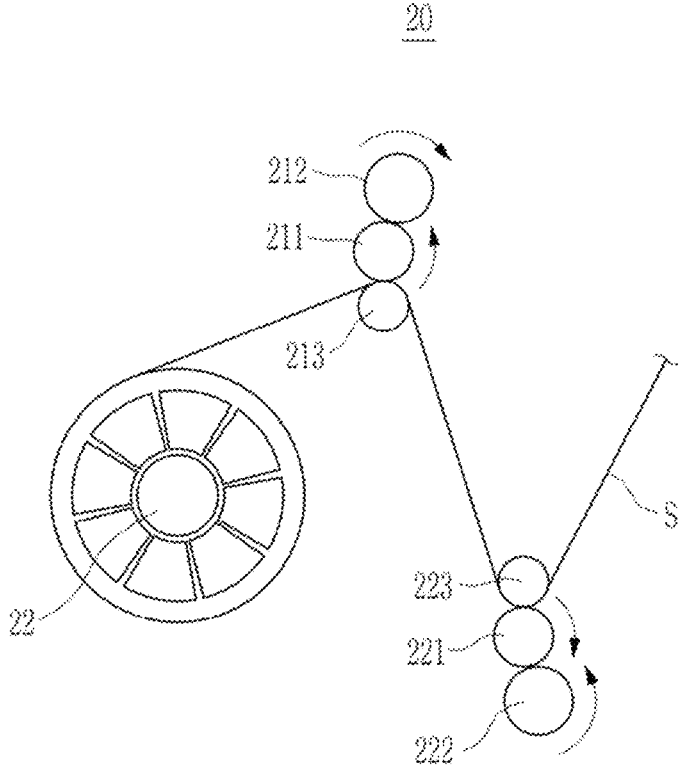
FIG. 3 is a schematic diagram of a foreign material removal unit in FIG. 2.

FIG. 3 is a schematic diagram of the foreign material removal unit in FIG. 2. Referring to FIG. 1 to FIG. 3, in the second step ST2, a foreign material on the surface of the separator S may be removed. The foreign material removal unit 20 may be configured to remove the foreign material of the surface of the separator S. The foreign material removal unit 20 may include a first adhesion roller 211 and a first removal roller 212, and a second adhesion roller 221 and a second removal roller 222.

The second step ST2 may include a second/first step in which, because the first adhesion roller 211 and the first removal roller 212 are sequentially in contact with the first surface of the separator S and rotated thereon, the foreign material on the first surface may be removed by using the difference in viscosity between the first adhesion roller 211 and the first removal roller 212. A second/second step in which, because the second adhesion roller 221 and the second removal roller 222 are sequentially in contact with the second surface of the separator S and rotated thereon, the foreign material on the second surface is removed by using the viscosity difference between the second adhesion roller 221 and the second removal roller 222.

In the second/first step and the second/second step, despite the difference in the viscosity between the first adhesion roller 211 and the first removal roller 212, and the difference in the viscosity between the second adhesion roller 221 and the second removal roller 222, black spots formed by a metal oxide penetrating the inside of the separator S may be maintained.

The first adhesion roller 211 and the first removal roller 212 may be in contact with each other and rotated sequentially with the first surface (the upper surface in FIG. 2 and FIG. 3) of the separator S. The first removal roller 212 is in contact with the first adhesion roller 211 and rotated and has the stronger adhesion force than that of the first adhesion roller 211. That is, by using the viscosity difference, the foreign material of the first surface of the separator S supported by the first reaction force roller 213 is removed.

The second adhesion roller 221 and the second removal roller 222 may be in contact with the second surface (the lower surface in FIG. 2 and FIG. 3) of the separator S and rotated. The second removal roller 222 may be in contact with the second adhesion roller 221 and rotated and may have the stronger adhesion force of that of the second adhesion roller 221. That is, by using the viscosity difference, the foreign material on the second surface of the separator S supported by the second reaction force roller 223 may be removed.

The adhesion force may be divided into five steps: weak, medium and weak, medium, medium and strong, and strong. The first and second adhesion rollers 211 and 221 in contact with the first surface and the second surface to remove the foreign materials on the surface of the separator S may proceed as rollers with a medium adhesion. The first and second removal rollers 212 and 222, which transfer and remove the foreign material transferred to the first and second adhesion rollers 211 and 221, may proceed as rollers with a strong adhesion In order to transfer the foreign material between the first and second adhesion rollers 211 and 221 and the first and second removal roller 212 and 222, there should be a difference of more than two steps out of five steps in the viscosity. Even in this case, the black spots formed by the metal oxide penetrating the inside of the separator S may be maintained in an original state thereof.

Figure 4:
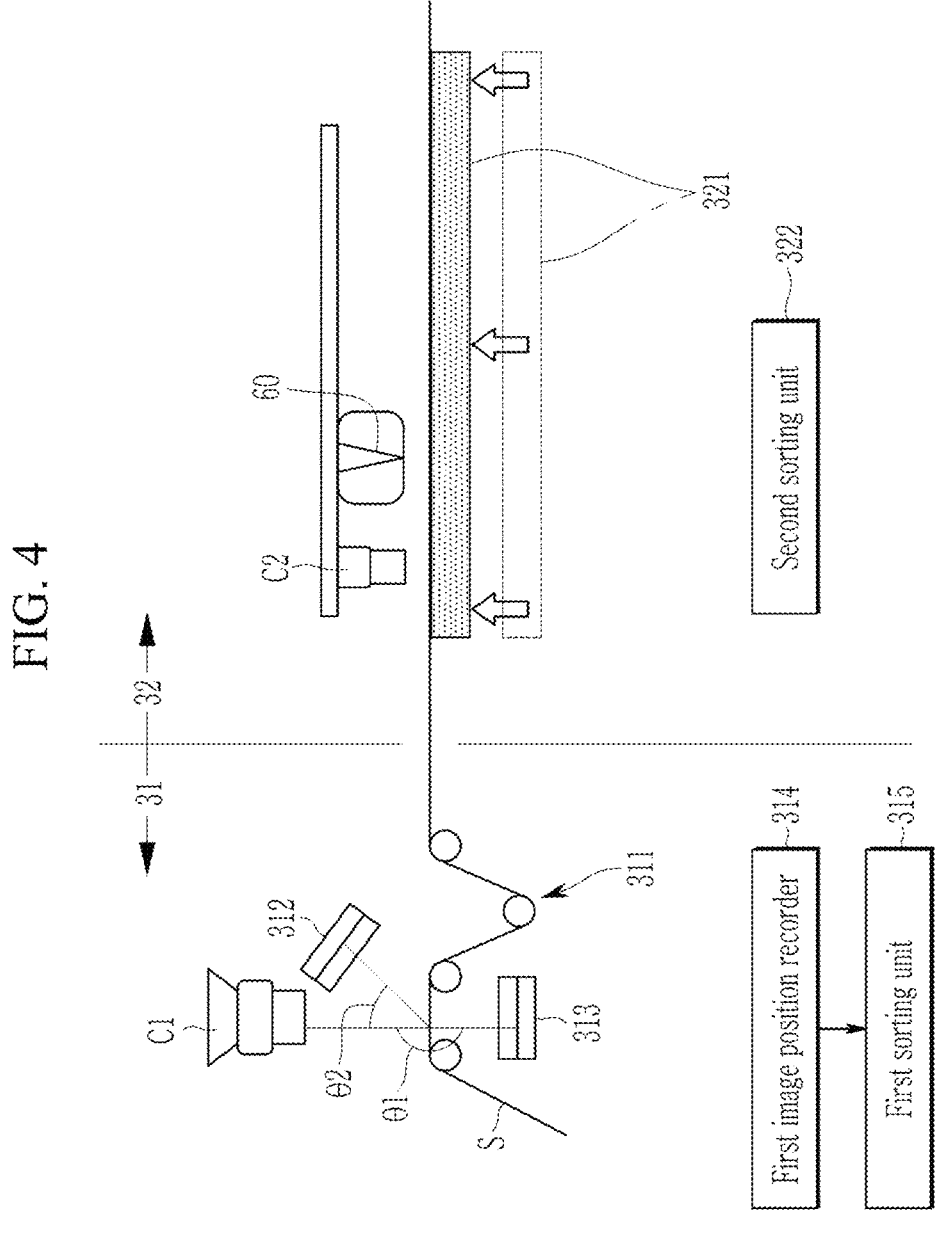
FIG. 4 is a schematic diagram of a first image measuring unit and a second image measuring unit in FIG. 2.

FIG. 4 is a schematic diagram of a first image measuring unit and the second image measuring unit in FIG. 2. Referring to FIG. 1, FIG. 2, and FIG. 4, in the third step ST3, a first image (referring to FIG. 5) for the part where the black spots are estimated in the separator S is obtained by using a first camera C1, and the position of the first image is recorded. In the third step ST3, a line camera may be used as the first camera C1 to measure the black and white first image from the separator S on the roll-to-roll driving unit 311.

The first image measuring unit 31 may be configured to obtain the first image for the part (e.g., location) where the black spots are estimated in the separator S via the foreign material removal unit 20 by the first camera C1 and to record the position of the first image. The first image measuring unit 31 may include a roll-to-roll driving unit 311 that stops when measuring the first image with the first camera C1 and measures the first image from the separator S.

In the fourth step ST4, the part where the black spots are estimated is first selected by using the first image, and the second image (referring to FIG. 6) for the black spots and the foreign materials other than the black spots in the separator S by using the second camera C2 for the recorded position is obtained. In the fourth step ST4, an area camera is used as the second camera C2. The second image may be measured from the separator S on the stage driving unit 321 following the roll-to-roll driving unit 311.

The second image measuring unit 32 may be configured to first select the part where the black spots are estimated by using the first image of the separator S that has passed through the first image measuring unit 31, and to acquire the second image for the black spots and the foreign material other than the black spots for the recorded position by the second camera C2. The second image measuring unit 32 may follow the roll-to-roll driving unit 311 and may include a stage driving unit 321 that measures the second image from the separator S with the second camera C2.

Again, referring to FIG. 2 and FIG. 4, the first image measuring unit 31 includes a reflected light 312 and a transmission light 313. The reflected light 312 may be composed and disposed to reflect the light from the separator S by lighting one surface of the separator S from the side of the first camera C1.

The transmission light 313 may be constructed and disposed to light the other surface of the separator S to transmit the light through the separator S. The reflected light 312 may be disposed to the first camera C1 at a second angle $\theta 2$, and the transmission light 313 may be directed to the first camera C1 at a second first angle $\theta 1$. As an example, the first angle $\theta 1$ may be 180 degrees and the second angle $\theta 2$ may be 45 degrees.

The first image measuring unit 31 may further include a first image position recorder 314. The first image position recorder 314 may mark a standard marking code on the separator S at an equal interval, recognize the coordinates during the movement of the separator S, and record the position of the first image.

In addition, the first image position recorder 314 may calculate the distance according to the movement time of the separator S to set the Y coordinate, and sets the X coordinate in the width of the separator S in the measurement area of the first camera C1, thereby recording the position of the first image.

The first image measuring unit 31 may further include a first sorting unit 315 that first sorts the black spots and the foreign materials other than the black spots by using data obtained from the first image. The second image measuring unit 32 may further include a second sorting unit 322 that secondary sorts the black spots and the foreign materials other than black spots by deep learning on the first image and the second image.

Referring to FIG. 1, FIG. 2, and FIG. 4, in the third step ST3, the first camera C1 is fixed and the first image may be measured from the separator S in the stopped state of the roll-to-roll driving unit 311. In the fourth step ST4, the second image may be measured from the moving separator S while moving the second camera C2 along with the raised stage driving unit 321. In the fourth step ST4, the first image obtained from all data obtained from the transmission mode and the reflection mode of the first camera C1 may be compared.

In the third step ST3, a standard marking code may be marked on the separator S at an equal interval to allow a coordinate to be recognized during the movement of the separator S. The position of the first image may be recorded in the first image position recorder 314.

Also, in the third step ST3, the Y coordinate may be fixed by calculating the distance according to the movement time of the separator S. The X coordinate may be set in the width of the separator S within the measurement area of the first camera C1 to record the position of the first image to the first image position recorder 314.

In the fifth step ST5, deep learning is performed on the first image and the second image with deep learning software to secondarily select the black spots and display the position of the black spots. The black spots sorting unit 40 may be configured to perform the deep learning on the first image and the second image with deep learning software, secondarily select the black spots, and display the position of the black spots.

In the fifth step ST5, the second sorting unit 322 secondarily selects the black spots and the foreign materials other than the black spots through the deep learning on the first image and the second image. In the deep learning, the color image of 2.5 μm resolution obtained by the second camera C2 may be identified and selected by the presence of black spots BS and other foreign materials FM.

Figure 5:
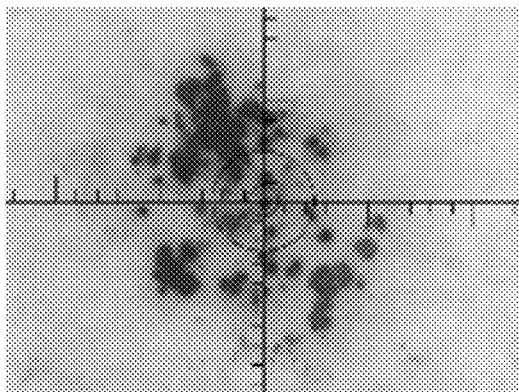
FIG. 5 is a view showing an optical image of actual black spots in a separator.
Figure 6:
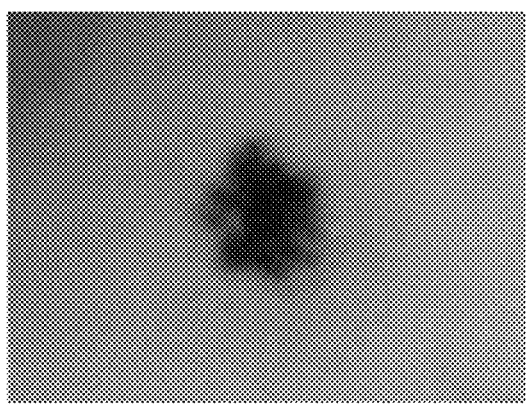
FIG. 6 is a view showing a first image obtained by acquiring all data obtained in a transmission mode of a separator.
Figure 7:
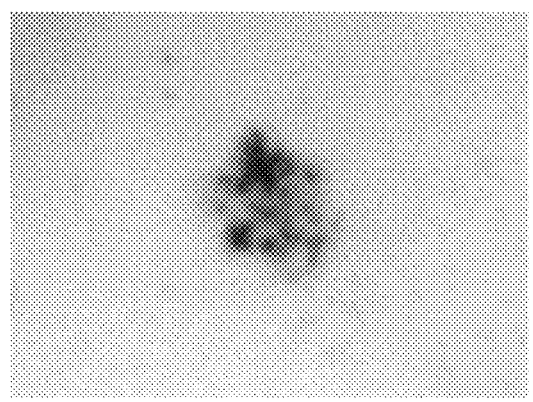
FIG. 7 is a view showing a first image obtained by acquiring all data obtained from a reflection mode of a separator.

FIG. 5 is a view showing an optical image of actual black spots in a separator. FIG. 6 is a view showing a first image obtained by acquiring all data obtained in a transmission mode for a separator. FIG. 7 is a view showing a first image obtained by acquiring all data obtained from a reflection mode for a separator.

Referring to FIG. 5 to FIG. 7, the data obtained from the transmission mode and the reflection mode have differences compared to the actual black spots. The images of the transmission mode and the reflection mode obtained from the third step ST3 may all be used and compared as the first image.

Figure 8:
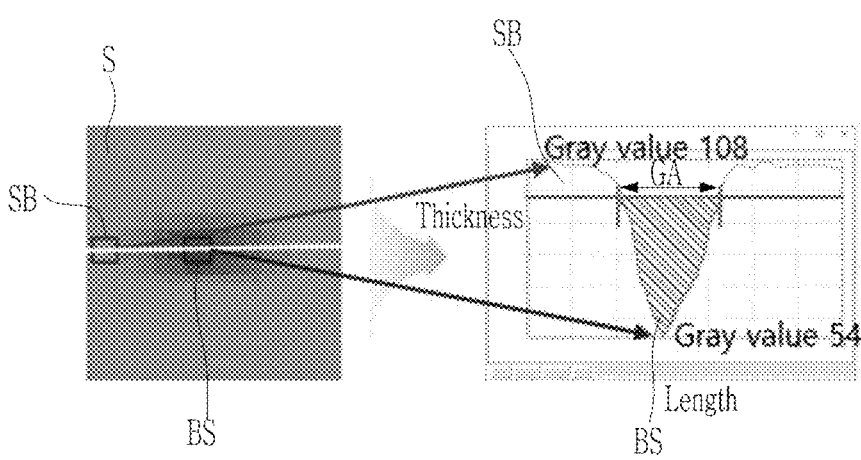
FIG. 8 is a view showing a plane image and a cross-section image of a separator and showing a method of classifying black spots and foreign materials into gray values as a first image in a separator.

FIG. 8 is a view showing a plane image and a cross-section image of a separator for demonstrating showing a method of classifying black spots and foreign materials into gray values as a first image in a separator. Referring to FIG. 8, in the fourth step ST4, basically, using a gray value (a gray level) of a pixel in the first image, the part with the difference between a base and a peak (peak) is detected as a part where the black spots are estimated. The black spots and the foreign materials may be distinguished by using other data.

FIG. 8 is the image from measuring the black spots of 100 μm size of the actual separator S. The pixel 1 of the black spots central portion is 10 μm. The gray value of the base SB of the separator S is shown to be 108, and the gray value of the central portion of the black spots BS is shown to be 54. The portion with the black spots BS may be a good area GA as a detection area.

In the fourth step ST4, a no-good area NGA that differs from the black spots for each data among the data may be excluded as an OR condition. The non-excluded good area GA may include a first area A1 capable of distinguishing the black spots BS and the foreign materials FM other than the black spots, and a second area A2 that is the same as the black spots (referring to FIG. 9 to FIG. 12).

In each data, the gray values of the no-good area NGA and the good area GA, and the first area A1 and the second area A2 of the good area GA are shown in Table 1 and FIG. 9 to FIG. 12

TABLE 1

| Characteristics | Black spots | Foreign material |
| --- | --- | --- |
| No-good area ratio (FIG. 9) | 0.51-0.77 | 0.16-0.83 |
| Peak change (FIG. 10) | 15-89 | 4-103 |
| Peak average (FIG. 11) | 7-51 | 2.65-76 |
| Gray value change (FIG. 12) | −13--70 | −4.5--92 |
| Average gray value (FIG. 13) | 41-95 | 35-107 |
| Minimum gray value (FIG. 14) | 8-87 | 7-104 |
| Aspect ratio | <1.5 | <10 |

Figure 9:
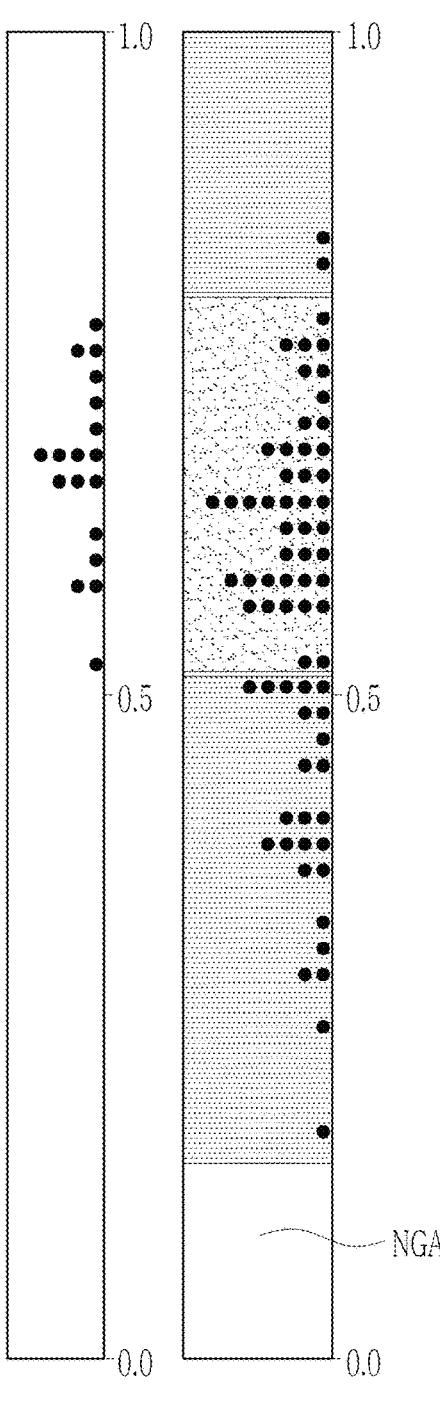
FIG. 9 is a view showing an image that primarily excludes foreign materials other than black spots by utilizing an inappropriate area ratio among a data obtained from a first image acquired from a first camera.

FIG. 9 is a view showing an image that primarily excludes foreign materials other than black spots by utilizing an inappropriate area ratio among data obtained from a first image acquired from a first camera. Referring to FIG. 9, in the fourth step ST4, the no-good area NGA is excluded by using a ratio of the no-good area in the data, thereby reducing an over-detection rate in which the foreign materials other than the black spots are excessively detected as the first image. That is, the no-good area NGA except the first area A1 and the second area A2 may be excluded, and an area exceeding 0.83 may be excluded from the first area A1.

Figure 10:
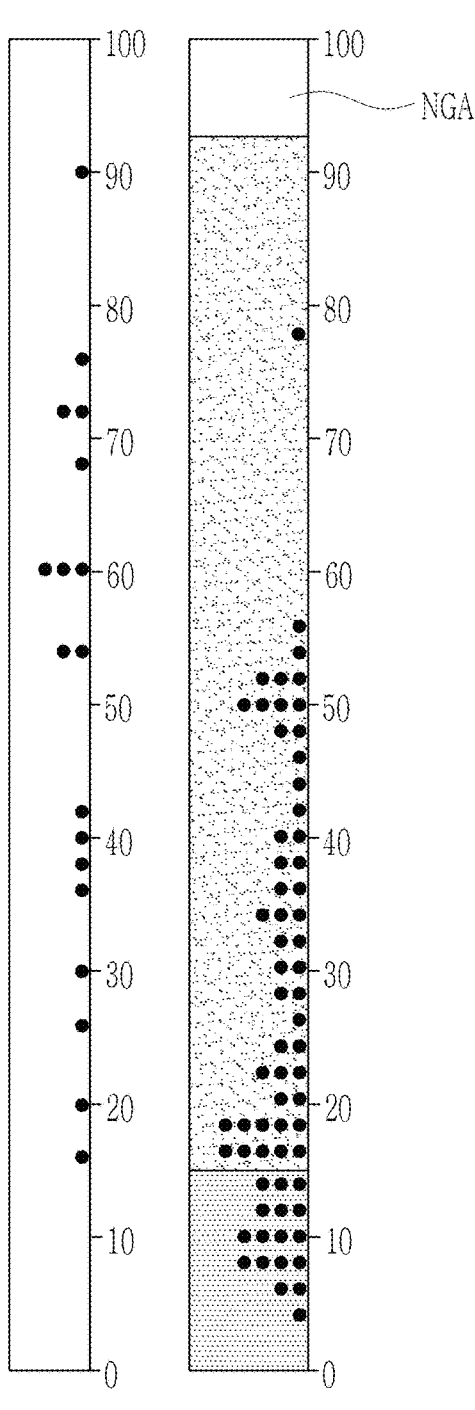
FIG. 10 is a view showing an image that primarily excludes foreign materials other than black spots by utilizing a peak change among a data obtained from a first image acquired from a first camera.

FIG. 10 is a view showing an image that primarily excludes foreign materials other than black spots by utilizing a peak change among a data obtained from a first image acquired from a first camera. Referring to FIG. 10, in the fourth step ST4, an over-detection rate in which the foreign materials other than the black spots are excessively detected as the first image may be reduced by excluding the no-good area NGA by using a peak difference (peak diff) of the gray value (gray level) among the data. That is, the no-good area NGA except the first area A1 and the second area A2 may be excluded.

Figure 11:
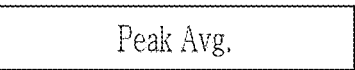
FIG. 11 is a view showing an image that primarily excludes foreign materials other than black spots by using a peak average among data obtained from the first image acquired from the first camera.
Figure 11:
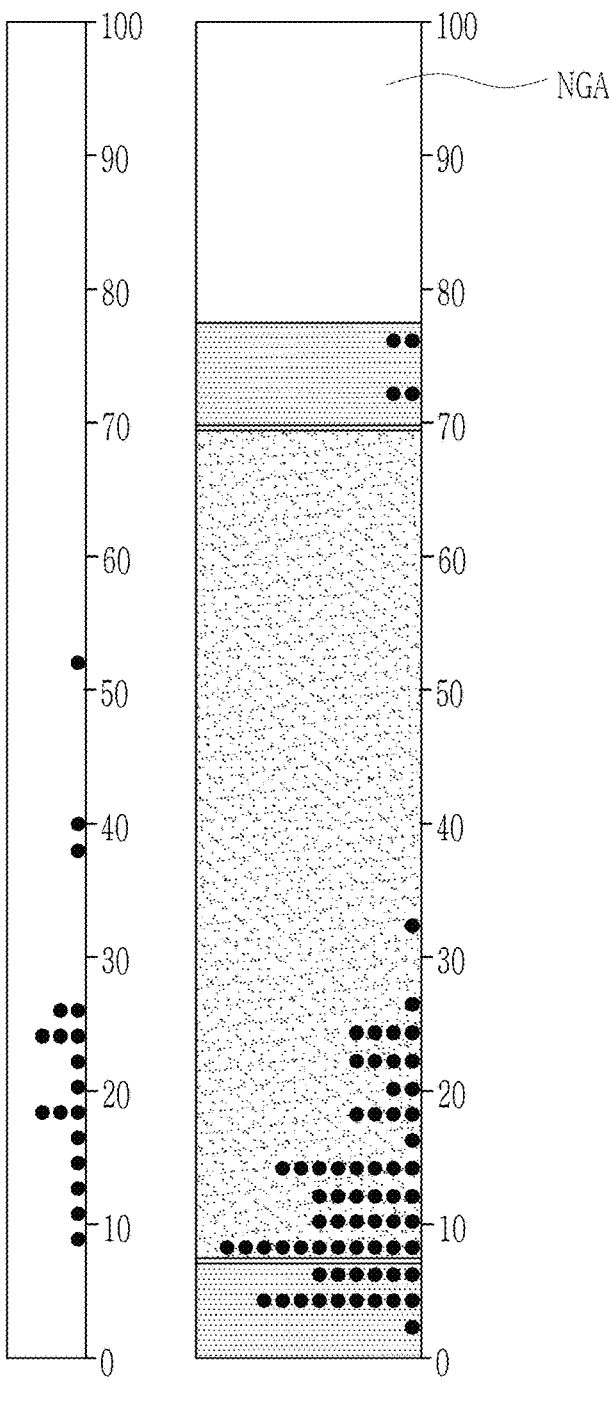

FIG. 11 is a view showing an image that primarily excludes foreign materials other than black spots by using a peak average among data obtained from the first image obtained from the first camera. Referring to FIG. 11, in the fourth step ST4, an over-detection rate in which the foreign materials other than the black spots are excessively detected as the first image, may be reduced by excluding the no-good area NGA by using a peak average (peak avg) of the gray value (gray level) among the data. That is, the no-good area NGA except the first area A1 and the second area A2 may be excluded.

Figure 12:
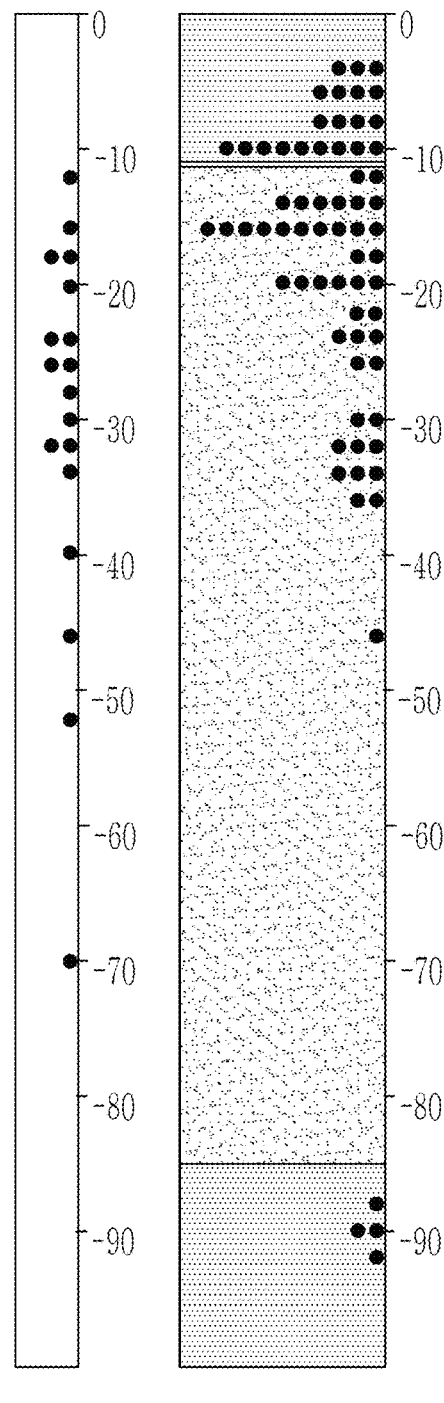
FIG. 12 is a view showing an image that primarily excludes foreign materials other than black spots by utilizing a gray value change among a data obtained from a first image acquired from a first camera.

FIG. 12 is a view showing an image that primarily excludes foreign materials other than black spots by utilizing a gray value change among data obtained from a first image acquired from a first camera. Referring to FIG. 12, in the fourth step ST4, an over-detection rate in which the foreign materials other than the black spots are excessively detected as the first image may be reduced by excluding the no-good area NGA by using a difference (diff) of the gray value (gray level) among the data. That is, the no-good area NGA except for the first area A1 and the second area A2 may be excluded, and an area exceeding −4.5 and an area less than −92 may be excluded from the first area A1.

Figure 13:
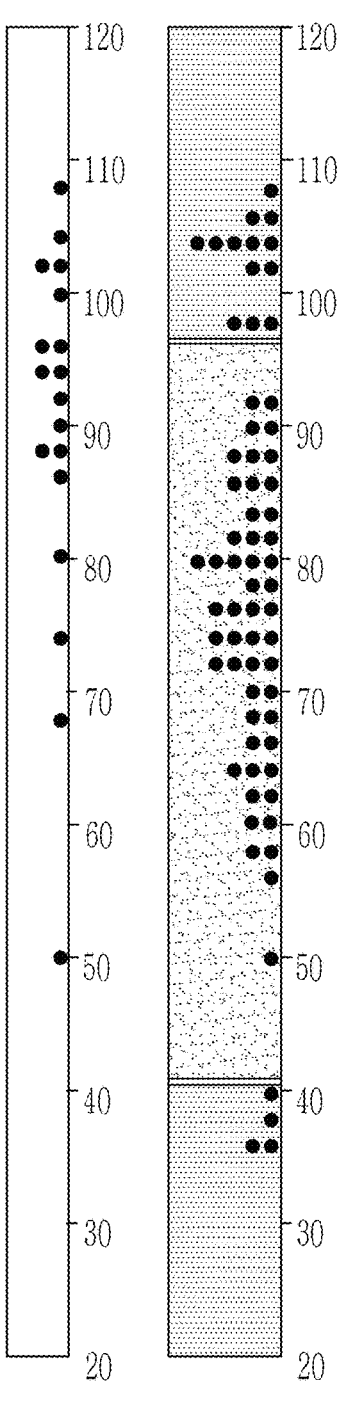
FIG. 13 is a view showing an image that primarily excludes foreign materials other than black spots by utilizing an average gray value level among a data obtained from a first image acquired from a first camera.

FIG. 13 is a view showing an image that primarily excludes foreign materials other than black spots by utilizing an average gray value level among data obtained from a first image acquired from a first camera. Referring to FIG. 13, in the fourth step ST4, an over-detection rate in which the foreign materials other than the black spots are excessively detected as the first image may be reduced by excluding the no-good area NGA by using a difference (avg gray diff) of the average gray value (gray level) among the data. That is, the no-good area NGA except for the first area A1 and the second area A2 may be excluded, and an area less than 35 and an area exceeding 107 may be excluded from the first area A1.

Figure 14:
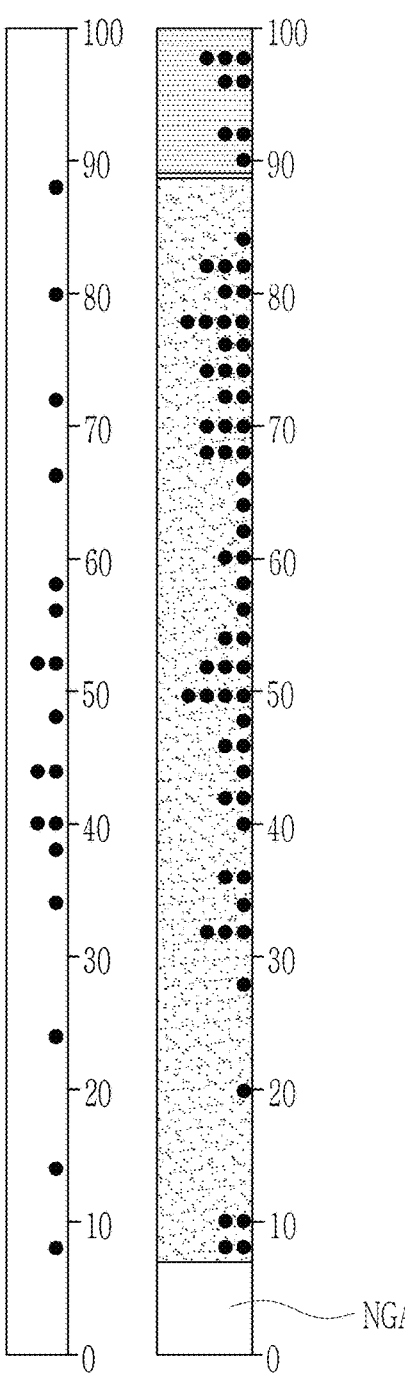
FIG. 14 is a view showing an image that primarily excludes foreign materials other than black spots by utilizing a minimum gray value level among a data obtained from a first image acquired from a first camera.

FIG. 14 is a view showing an image that primarily excludes foreign materials other than black spots by utilizing a minimum gray value level among a data obtained from a first image acquired from a first camera. Referring to FIG. 14, an over-detection rate in which the foreign materials other than the black spots are excessively detected as the first image may be reduced by excluding the no-good area NGA by using a difference (min gray diff) of the minimum gray value (gray level) among the data. That is, the no-good area NGA except the first area A1 and the second area A2 may be excluded.

Figure 15:
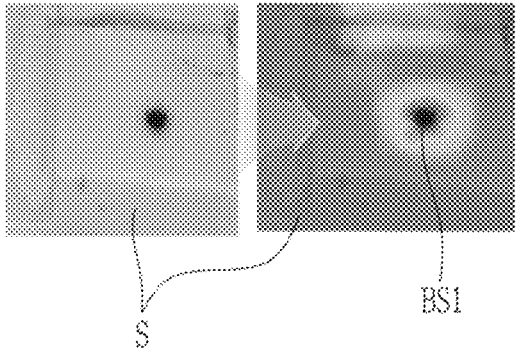
FIG. 15 and FIG. 16 are views showing an image in which black spots are detected as a no-good NG by deep learning a first image and a second image and secondarily selecting black spots.
Figure 16:
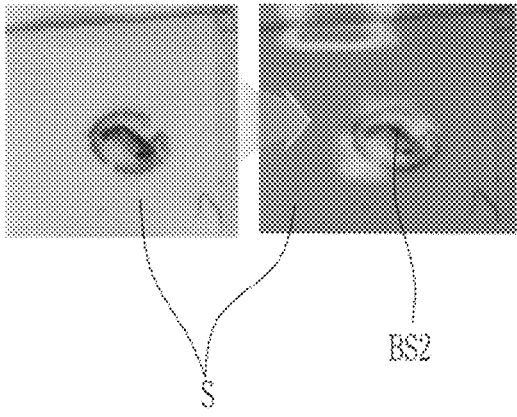
Figure 17:
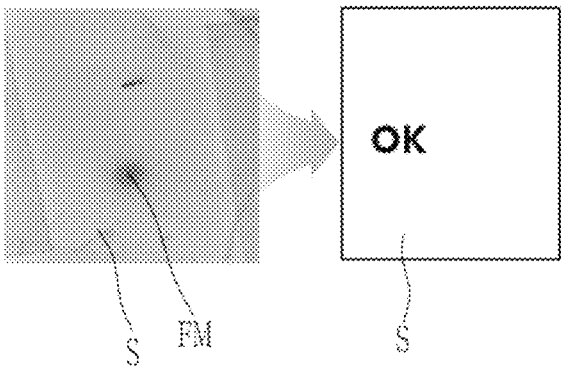
FIG. 17 is a view showing an image that detects foreign materials other than black spots as a good OK by secondarily selecting materials other than black spots by deep learning a first image and a second image.

FIG. 15 and FIG. 16 are views showing an image in which black spots are detected as a no-good NG by deep learning a first image and a second image and secondarily selecting black spots. FIG. 17 is a view showing an image that detects foreign materials other than black spots as a good OK by secondarily selecting materials other than black spots by deep learning a first image and a second image.

Referring to FIG. 15 to FIG. 17, in the fifth step ST5, the black spots are secondarily selected to detect the black spots as a no-good NG by deep learning of the first image and the second image, a material other than the black spots may be secondarily selected, and the foreign material FM other than black spots may be detected as a good OK.

Again, referring to FIG. 1 and FIG. 2, the method for finding the black spots of the separator according to an embodiment may further include a sixth step ST6 of automatically analyzing components of the black spots by using equipment. The black spots may be characterized twice in the fourth step ST4 and the fifth step ST5. In the sixth step ST6, the components of the black spots may be analyzed with X-rays by using an X-ray fluorescence analysis (XRF) equipment.

The system for finding the black spots of the separator of an embodiment may further include a component analysis unit 60 that analyzes the components of the black spots selected in the black spots sorting unit. The component analysis unit 60 may be configured to analyze the components of the black spots with X-rays by using an X-ray Fluorescence Analysis (XRF) facility. The X-ray fluorescence analysis facility may be mounted together on the moving axis of the second camera C2 and may be moved to a specific coordinate to analyze the components of the black spots by using X-rays.

Figure 18:
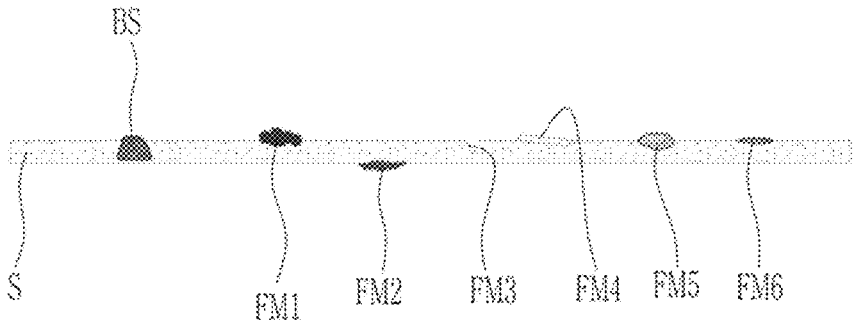
FIG. 18 is a cross-sectional view showing black spots detected in a separator and foreign materials other than black spots excluded from a first selection.

FIG. 18 is a cross-sectional view showing black spots detected in a separator and foreign materials other than black spots excluded from a first selection. FIG. 18 is the result that is obtained by the method and system of the embodiment in the sample separator S that was not found with the naked eye. The black spots BS found with the method and system for finding the black spots of the separator of the embodiment may be formed of metal components.

As an example, the metal component may include one of copper, zinc, and stainless steel. The foreign material FM other than the black spots may include one of a positive active material FM1, a negative active material FM2, a stamping FM3, a folding FM4, a separator foreign material FM5, and a side reactant FM6. The foreign material FM other than the black spots may be removed in the foreign material removal unit 20, so that an over-detection of the first image is prevented.

By way of summation and review, it is desirable to find the black spots on the separator and figure out which of the metal foreign materials caused the black spots. One method to find these black spots has been by the human eye. Because the short circuits appear as black spots on the negative electrode and the separator, a person may observe the negative electrode and the separator with the naked eye and find the black spot.

However, because a visual inspection with the naked eye has a large dispersion among inspectors, a visual inspection could miss small black spots of hundreds of micrometers. Even when several cells are dismantled and analyzed, the likelihood of finding all the black spots may be very low.

In contrast, example embodiments relate to a system for finding black spots of a separator that cause fine short circuits as dV defects. That is, example embodiments provide a system for finding black spots of a separator that automatically detects black spots. In addition, example embodiments provide a system for finding black spots of a separator that dramatically improves a discovery ratio of black spots and eliminates a dispersion according to an analyst.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system for finding black spots in a separator, the system comprising:

a winding machine and a rewinder that take out and wind the separator from a rechargeable battery cell to produce and supply a sample of the separator;

a foreign material removal unit that removes a foreign material from a first surface and a second surface of the separator, the first surface and the second surface being opposite to each other, wherein the black spots penetrating an inside of the separator remain after the removal, and wherein the foreign material removal unit includes a plurality of rollers;

a first image measuring unit that obtains a first image of a location where the black spots are estimated to be in the separator passing through the foreign material removal unit with a first camera, and that records a position of the first image, wherein the first camera is part of the first image measuring unit, wherein the first camera is a line camera, and the first image measuring unit includes a roll-to-roll driving unit that stops when measuring the first image with the first camera and measures the first image from the separator, wherein the roll-to-roll driving unit includes a roller that can be stopped, wherein the first image measuring unit includes a reflected light that lights the first surface of the separator from a side of the first camera, and reflects the light from the separator, and a transmission light that lights the second surface of the separator and transmits light through the separator, wherein the reflected light is disposed at an angle of 45 degrees with respect to the first camera, and wherein the transmission light is disposed at an angle of 180 degrees with respect to the first camera;

a second image measuring unit that first selects the location where the black spots are estimated to be and acquires a second image of the black spots for the recorded position by a second camera by using the first image of the separator passing through the first image measuring unit, wherein the second camera is part of the second image measuring unit; and a black spots sorting unit that displays the position after secondarily selecting the black spots by deep learning on the first image and the second image with a deep learning software.

2. The system for finding black spots in the separator as claimed in claim 1, wherein:

the winding machine unfolds a selected electrode assembly, and attaches one surface of one separator among an unfolded positive electrode, an unfolded negative electrode, and unfolded two separators to a core of the winding machine, and the winding machine winds the attached one separator among the unfolded positive electrode, negative electrode, and two separators to the core of the winding machine to produce the sample of the separator.

3. The system for finding black spots in the separator as claimed in claim 1, wherein the foreign material removal unit includes:

a first adhesion roller that is sequentially in contact with and rotates the first surface of the separator to remove the foreign material, and a first removal roller that has a stronger adhesion than that of the first adhesion roller by rotation in contact with the first adhesion roller; and a second adhesion roller that is sequentially in contact with and rotates a second surface of the separator to remove the foreign material, and a second removal roller that has a stronger adhesion than that of the second adhesion roller by rotation in contact with the second adhesion roller.

4. The system for finding black spots in the separator as claimed in claim 1, wherein:

the second camera is an area camera, and the second image measuring unit includes a stage driving unit that follows the roll-to-roll driving unit and measures the second image from the separator.

5. The system for finding black spots in the separator as claimed in claim 1, wherein the first image measuring unit further includes a first image position recorder for recording the position of the first image by recognizing coordinates during a movement of the separator, and by displaying a reference marking code on the separator with an equal interval.

6. The system for finding black spots in the separator as claimed in claim 1, wherein the first image measuring unit further includes a first image position recorder that calculates a distance according to a movement time of the separator to set a Y coordinate, and that records the position of the first image by setting an X coordinate in a width of the separator within a measurement area of the first camera.

7. The system for finding black spots in the separator as claimed in claim 1, wherein:

the first image measuring unit further includes a first sorting unit that first sorts the black spots by using data that is capable of being obtained from the first image, and the second image measuring unit further includes a second sorting unit that performs deep learning on the first image and the second image to secondarily sort the black spots.

8. The system for finding black spots in the separator as claimed in claim 1, further comprising a component analysis unit configured to analyze components of the black spots selected by the black spots sorting unit.

9. The system for finding black spots in the separator as claimed in claim 8, wherein the component analysis unit is configured to analyze the components of the black spots with X-rays using an X-ray fluorescence analysis equipment.

10. The system for finding black spots in the separator as claimed in claim 1, wherein the black spots are formed from metal components.

11. The system for finding black spots in the separator as claimed in claim 10, wherein the metal components include at least one of copper, zinc and stainless steel.

12. The system for finding black spots in the separator as claimed in claim 1, wherein the foreign material includes at least one of a positive active material, a negative active material, a stamping, a folding, a separator foreign material, and a side reactant.

* * * * *